Nov. 20, 1956 E. J. MASTNEY ET AL 2,770,982
INDEX MECHANISM
Filed Dec. 6, 1952
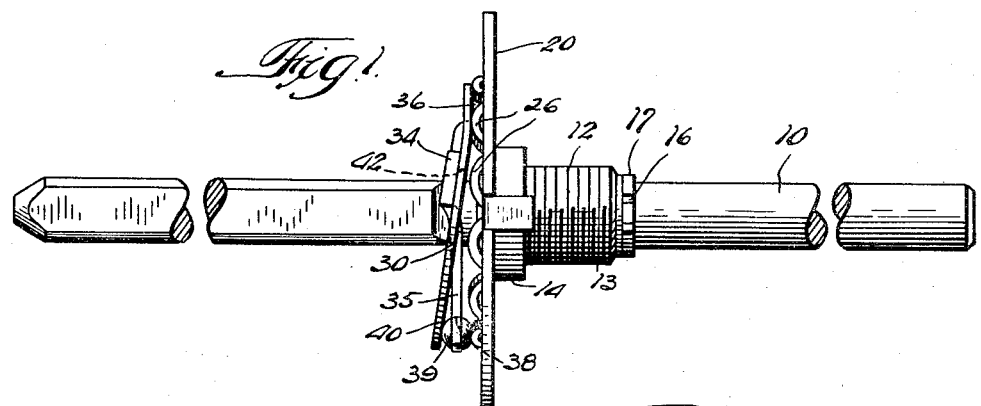
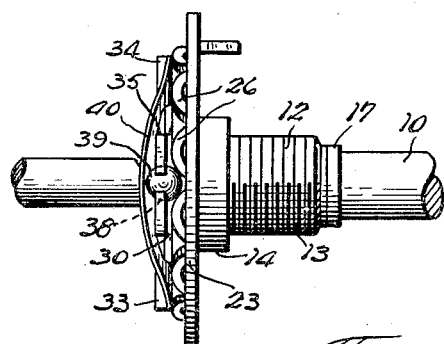
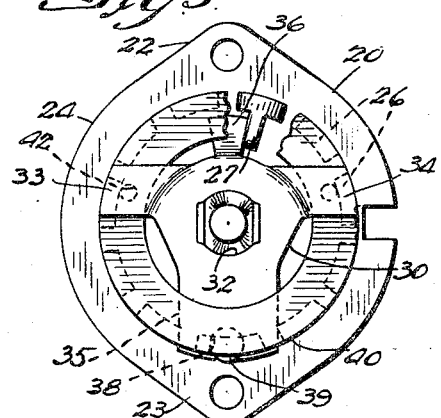
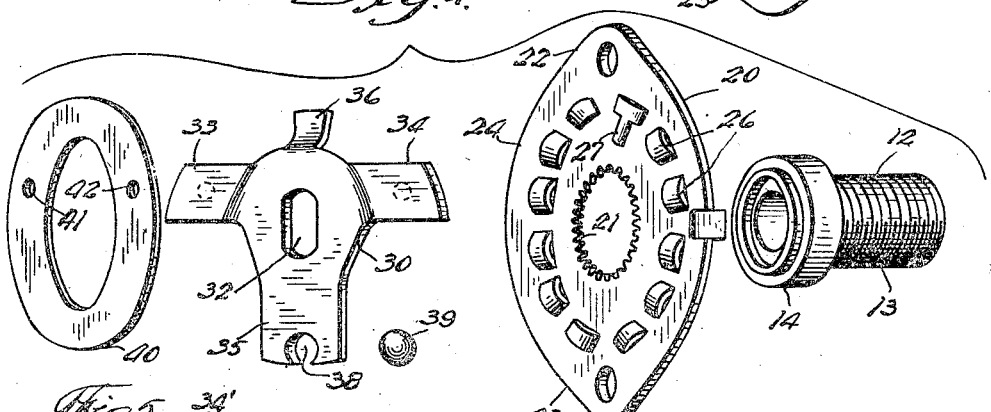
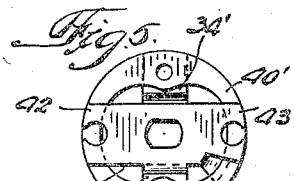
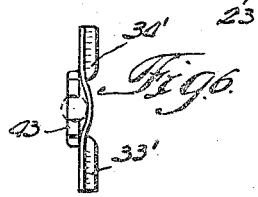
INVENTORS
Edward J. Mastney
John H. Williams
By Robert L. Kahn Atty.

United States Patent Office 2,770,982
Patented Nov. 20, 1956

2,770,982

INDEX MECHANISM

Edward J. Mastney, Berwyn, and John H. Williams, Barrington, Ill., assignors to Oak Mfg. Co., a corporation of Illinois Application December 6, 1952, Serial No. 324,586

1 Claim. (Cl. 74—527)

This invention relates to an index mechanism, particularly for use on rotary switches and similar devices. An index mechanism embodying the present invention is characterized by simplicity and economy of parts as well as by minimum tooling requirements.

In order that the invention may be understood, reference will now be made to the drawings wherein exemplary embodiments of the invention are illustrated, it being understood that changes may be made without departing from the spirit of the invention.

Referring therefore to the drawings:

Figure 1 is a side view of an index mechanism secured on a shaft, the index mechanism embodying the present invention;

Figure 2 is a side view similar to Figure 1 showing the index mechanism in a different position;

Figure 3 is a front view of the index mechanism of Figure 1;

Figure 4 is an exploded view of the index mechanism shown in Figure 1;

Figure 5 is a front view of a modified form of index mechanism;

Figure 6 is a side elevation of the index mechanism shown in Figure 5.

The index mechanism embodying the present invention is associated with a length of shaft 10. Shaft 10 carries bushing 12 consisting of threaded portion 13 and collar portion 14. Shaft 10 is slotted annularly at 16 and has C washer 17 disposed in said slot to prevent movement of the bushing to the right of the shaft as seen in Figures 1 and 2.

Collar portion 14 of the bushing has the free end portion shouldered as shown and has attached thereto index plate generally indicated by numeral 20. Index plate 20 has serrated aperture 21 adapted to fit over the shouldered end of collar 14, the metal of the collar then being staked over the index plate edge to anchor the index plate securely to the bushing.

Index plate 20 may have any desired shape and is here shown as having a generally elliptical shape with end portions 22 and 23 and body portion 24. End portions 22 and 23 are apertured to accommodate mounting bolts for holding switch sections with which the index mechanism is particularly adapted to be used. An example of a switch with which the index mechanism described herein is particularly useful is disclosed in United States Letters Patent 2,186,949 issued on January 16, 1940. Index plate 20 has a number of index deformations or bumps 26 arranged in a circular pattern in the body of the plate. These index deformations may have any desired angular spacing and have any desired angular extent. One or more index stops 27 may be formed in the index plate to limit the rotation of the shaft with respect to the index plate.

Rigidly attached to the shaft in proximity to the index plate is yoke 30 having a generally cruciform shape. Yoke 30 is disposed against index plate 20 on the front side having the index bumps 26, this being the free side of the plate. It is possible to reverse the index plate and mount the same on the bushing so that instead of bumps there are index depressions.

Yoke 30 has aperture 32 for accommodating the shaft, the shaft being flattened for convenience. The attachment of the yoke to the shaft may be effected in any suitable manner as by staking the shaft metal. Yoke 30 has opposed spring-attaching fingers 33 and 34, and also has ball-retaining finger 35 and spring support finger 36. Spring-attaching fingers 33 and 34 and ball-retaining finger 35, together with the body of the yoke may be flat. Spring support finger 36 is bent laterally of the yoke, the direction of bending being such that this spring support finger is nearer the index plate than the body of the yoke.

Ball-retaining finger 35 has aperture 38 for accommodating ball bearing 39. Aperture 38 is large enough to permit ball 39 to move freely through the same while restraining the ball against movement laterally of retaining finger 35. Rigidly attached to yoke 30 is normally flat spring ring 40 having apertures 41 and 42 so located as to register with rivets carried by spring attaching fingers 33 and 34. Yoke 30 and spring 40 are permanently attached, the spring ring engaging the spring-attaching fingers on the index plate side of the yoke while overlying the ball-retaining finger and spring support finger.

Yoke 30 is so proportioned that ball 39 in aperture 38 will ride along index deformations 26 when the index mechanism is assembled as shown in Figures 1 to 3 inclusive. Spring support finger 36 will maintain spring 40 clear of the index plate. It will be noted that yoke 30 has mounting aperture 32 eccentric of the various fingers. As a result, ball 39 will be further from the rivets holding the spring ring to the yoke than the part of the spring resting upon spring support finger 36. By controlling this eccentricity, it is possible to provide for a desired spring action.

Instead of having only one index ball, it is possible to provide a symmetrical yoke having opposed ball-retaining fingers and spring-attaching fingers. Referring to Figures 5 and 6, yoke 30' has opposed spring-attaching fingers 33' and 34' carrying spring ring 40'. It will be noted that spring 40' varies in width, the width being a maximum at the regions where the spring is riveted. The yoke in this modification is preferably symmetrical and has ball-retaining fingers 42 and 43 opposed to each other. Suitable ball bearings are provided in the apertures of the ball-retaining finger.

The index mechanism illustrated in Figures 1 to 4 inclusive may be used with an index plate having any desired number of index positions and index deformations. The modification shown in Figures 5 and 6 will require sufficient deformations so that the diametrically opposed balls may engage deformations over a desired operating range of the mechanism.

It is understood that the various parts are made of suitable metal. Thus the shaft and index plate may be of steel. The bushing may be of steel or brass.

What is claimed is:

An index mechanism comprising an index plate having a number of index deformations disposed along the arc of a circle with respect to the center of a shaft passing through the index plate, a yoke rigidly attached to the shaft, said yoke being generally cruciform in shape and being disposed in proximity to said index plate, a generally circular spring ring, readily detachable means for mounting said spring ring at two spaced points on two opposed arms of said yoke, at least one of the remaining arms being apertured to accommodate a ball bearing, said opposed arms being on a line substantially closer to the shaft center than the aperture in one of the remaining arms for accommodating said ball bearing, said yoke arm being so proportioned that the ball bearing rides the index deformations, said spring ring passing underneath the two ring attaching fingers of the yoke and lying over the remaining two arms of the yoke.

References Cited in the file of this patent

UNITED STATES PATENTS

| | | |
|---|---|---|
| 2,130,219 | Allison et al. | Sept. 13, 1938 |
| 2,292,717 | Rubenstein | Aug. 11, 1942 |
| 2,558,502 | Williams | June 26, 1951 |